July 12, 1960 M. CANEPA 2,945,091

DECODING-PRINTING APPARATUS

Filed June 10, 1955 3 Sheets-Sheet 1

INVENTOR.
MICHELE CANEPA

BY Kenyon and Kenyon

ATTORNEYS

July 12, 1960 M. CANEPA 2,945,091

DECODING-PRINTING APPARATUS

Filed June 10, 1955 3 Sheets-Sheet 2

INVENTOR.
MICHELE CANEPA
BY Kenyon and Kenyon
ATTORNEYS

July 12, 1960 M. CANEPA 2,945,091

DECODING-PRINTING APPARATUS

Filed June 10, 1955 3 Sheets-Sheet 3

INVENTOR.

BY MICHELE CANEPA

Kenyon and Kenyon

ATTORNEYS

United States Patent Office 2,945,091

Patented July 12, 1960

2,945,091

DECODING-PRINTING APPARATUS

Michele Canepa, South Norwalk, Conn., assignor to Olivetti Corporation of America, New York, N.Y., a corporation of Massachusetts Filed June 10, 1955, Ser. No. 514,631

4 Claims. (Cl. 178—34)

The present invention relates generally to an output mechanism for calculating machines and more particularly to apparatus for both decoding and printing binary information.

In conventional calculating machines, numerical information in decimal notation is fed into the machine where it is translated or coded into corresponding binary values. Inasmuch as the various mathematical operations are carried out with binary numbers, it becomes necessary to re-translate or decode the binary result into decimal terms in order to print or permanently record the numerical result.

Thus, in the conventional calculator, the output section usually includes two major elements, namely, a decoder and a printing or recording device. A separate printing wheel and an actuating mechanism therefor are entailed for each digit of the decimal result, and the fact that a decoder is required in conjunction with each actuating mechanism adds materially to the complexity, size and cost of the machine.

Accordingly, it is the primary object of the present invention to simplify the output section of a calculating machine by providing means utilizing the printing mechanism as a decoding device.

More specifically, iti s an object of the invention to provide a system for decoding and printing binary information wherein the printing wheel bearing the decimal characters is angularly displaced by an actuating mechanism in accordance with applied binary information, whereby the decoding action is carried out by the printing mechanism.

Also, an object of the invention is to provide a commutator assembly arranged for converting binary information appearing in simultaneous form into corresponding binary information in sequential or serial form. A significant feature of the arrangement resides in the fact that a common commutator assembly responsive to the applied binary information provides operating voltages for the stepping and reversing clutches of a group of printing mechanism so as properly to index the operation of the printing wheels, thereby further simplifying the output system.

Still another object of the invention is to provide a decoder-printer structure of efficient and sturdy design which materially simplifies the construction of the output section of the calculating machine and effects a substantial saving in cost.

Briefly stated, in a decoding-printing apparatus in accordance with the invention, one or more printing wheels is provided, each bearing decimal characters at circumferentially spaced positions thereon. The characters are selectable to form a printed impression on a recording medium according to the angular position of the printing wheel. This angular position is determined by the binary information supplied to the system so that the system performs the function of translating the binary terms into decimal notation and also the function of recording said decoded information.

In order to orient the printing wheel, there is provided an indexing shaft driven through a step-clutch in a manner whereby the indexing shaft is caused sequentially to undergo a series of angular displacements corresponding to the significances or weights of the individual binary digits supplied thereto in serial order, namely, one, two, four and eight. Depending on the value of each digit, whether it be zero or one, means are provided optionally to couple the indexing shaft to the printing wheel so that upon completion of a series of angular-displacements, the wheel will have been rotated an aggregate angular amount representative of the binary information supplied.

This angular amount is reflected in the particular decimal character placed in printing position relative to a recording medium such as a tape, whereby movement of the wheel into engagement with the tape is all that is required to record the binary information in decimal form. Subsequent to the recording operation, a reversing clutch resets the angular position of the wheel by an amount which is equal the total angular displacement effected by the step-clutch in response to the applied binary values, whereby the wheel is caused to assume its initial or starting position prior to the next decoding and printing operation.

Also provided is a commutator system for converting simultaneously-present or static binary values into a serial train of binary values and for controlling the operation of the stepping clutch and reversing clutch mechanism so as properly to orient the printing wheel in response to the applied binary values and thereafter to cause said wheel to revert to its starting position.

For a better understanding of the invention, as well as other objects and further features thereof, reference is had to the following detailed description thereof to be read in connection with the accompanying drawings wherein like components in the several views are identified by like reference numerals.

Figure 1:
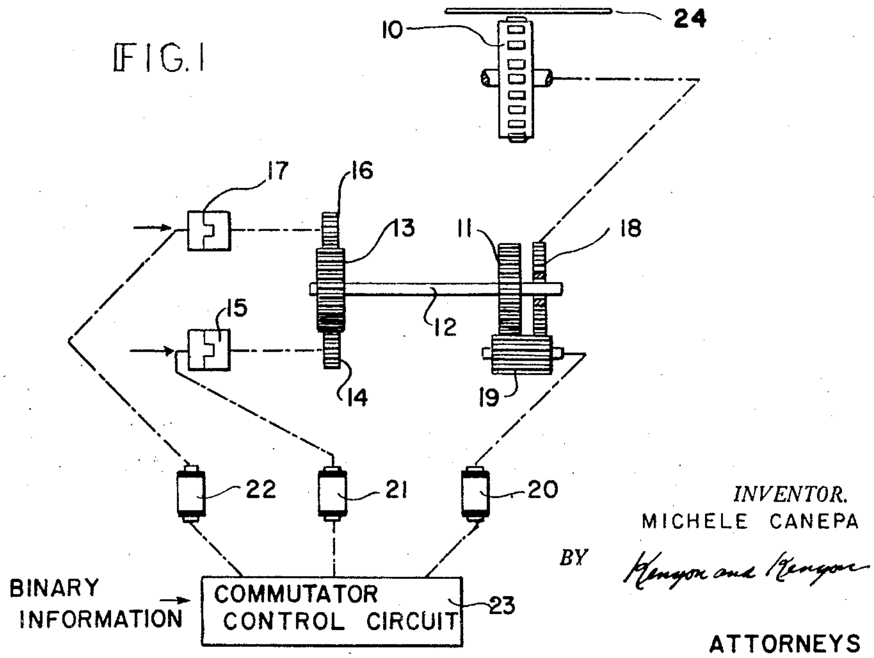
Fig. 1 is a block diagram of the output mechanism in accordance with the invention.

Referring now to the drawings and more particularly to Fig. 1, to facilitate an understanding of the operating principles underlying the invention the major element of the decoding-printing system and their cooperative relation are illustrated schematically. The system includes a printing wheel 10 having characters including numerals 0 to 9 arranged at equi-spaced positions or steps along the circumference of the wheel. Selectively to position the wheel there is provided a main gear 11 keyed to one end of an indexing shaft 12, the other end having a spur gear 13 attached thereto to drive same. The spur gear 13 is driveable in one direction by a pinion 14 which is operatively coupled through a step-clutch 15 to a suitable motor means. Spur gear 13 is alternatingly driveable in the opposite direction by a pinion 16 which is coupled through a reverse-clutch 17 and suitable reversing gears to said motor means.

Printing wheel 10 is operatively coupled through an appropriate gear train to an idler gear 18 which is freely rotatable about main shaft 12. A coupling gear 19 is provided which is shiftable into meshing relation with main gear 11 and idler gear 18, the width of the coupling gear being sufficient to bridge both the main gear and the idler gear. Thus the motion of the main gear is transmitted to the printing wheel to orient same relative to a recording tape 24.

Coupling gear 19 is optionally shiftable into engagement with gears 11 and 18 by means of an electromagnet 20, the step-clutch 15 is rendered operative by an electromagnet 21 and the reverse-clutch 17 is rendered operative by an electromagnet 22. The energization of these electromagnets is governed by a commutator control circuit 23 to which the input binary signals are supplied.

To demonstrate how the system operates, we shall assume that the input signals are of the binary coded-decimal type and are made up of four digits such that the first digit has the significance or weight "1," the second "2," the third "4" and fourth "8." A binary code of this type has sixteen permutations and we shall therefore assume that to record this code the printing wheel contains sixteen characters representative of the different code combinations.

Let us first consider the nature of the information supplied to the commutator control circuit 23. In the input section of the calculating machine, information is introduced in decimal form, which information is converted into binary form and is operated upon to produce a final result also in binary terms. Hence, fed into the circuit 23 is a binary signal, the four digits thereof being simultaneously present.

The commutator is adapted to read off these digits in serial order and to energize electromagnet 20 accordingly. Thus, with a binary number 0110, electromagnet 20 will sequentially be non-energized (0), energized (1), energized (1) and non-energized (0). The coupling gear 19 effects a coupling link between the printing wheel 10 and main gear 11 only when electromagnet 20 is energized in response to a (1) digit, the coupling gear otherwise being retracted.

Let us now consider the functioning of the step-clutch 15. The commutator control circuit 23 supplies actuating pulses to electromagnet 21 of the step-clutch, such that as the four successive digits of the code series are introduced, the main gear 11 is angularly displaced first one step, then two steps, then four steps and finally eight steps in keeping with the successive weights of the digits.

A different character on the wheel will assume a printing position relative to tape 24 for each step position of the wheel. However the printing wheel is caused to step only when coupling gear 19 is in engagement with the main gear and the idler gear, hence when the coupling gear 19 is withdrawn, then the stepping action of the main gear is not transmitted to the printing wheel. Thus in the case of binary number 0110, at the introduction of the first digit, the printing wheel remains stationary, with the second digit it is shifted two steps, with the third digit four steps and with the fourth digit it again remains stationary. Consequently, a total shift of six steps is produced in response to binary number 0110, and the wheel presents the decimal character 6 to the tape.

A mechanism (to be later described) is provided which acts after the final setting of the printing wheel to impress the selected character on the tape. This may be accomplished either by moving the tape into printing contact with the wheel or vice versa. Finally, after the printing operation is completed, the system acts to reset the wheel to its starting position in preparation for the next selection. This is effected by reverse-clutch 17 which receives an energizing voltage from control circuit 23 after the completion of the printing operation, thereby causing a reverse movement of main shaft 12. In the reverse direction a protuberance on the main gear engages a complementary protuberance on the idler gear 63 which, when coupling gear 19 is retracted, acts to engage both main gear 11 and idler gear 18 and, to prevent movement thereof, is released when the reverse clutch is rendered operative and serves to permit reversal of the printing wheel to an extent equal to the aggregate angular displacement effected during the indexing action. The system is now ready for decoding and printing the next binary number.

Figure 4:
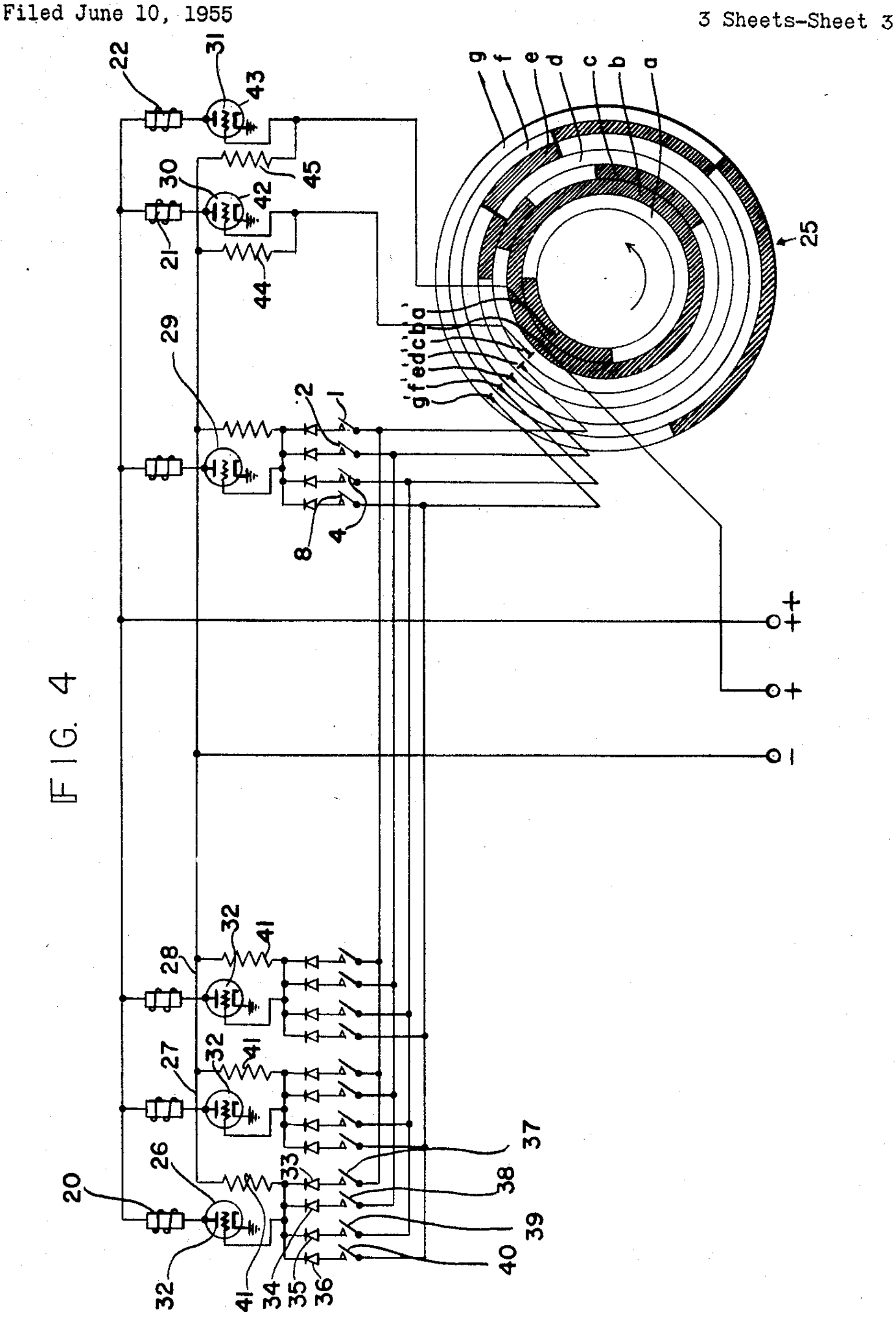
Fig. 4 is a schematic diagram of a commutator system in accordance with the invention.

Referring now to Fig. 4, the commutator control circuit comprises a commutator assembly, generally designated by numeral 25, and a plurality of identical coupling-gear control circuits 26, 27, 28 and 29, a step-clutch control circuit 30 and a reverse-clutch control circuit 31.

The commutator assembly 25 is constituted by seven concentrically arranged tracks *a*, *b*, *c*, *d*, *e*, *f* and *g* on a common base which rotates relative to fixed contact brushes *a'* to *g'*. The surface of track *b* is entirely covered with conductive material, whereas the remaining tracks include alternate arcuate segments of conductive material and of non-conductive material. Brush *b'* is connected to a source of positive bias (+). The conductive areas on the six tracks are electrically interconnected, hence the voltage impressed on the conductive area of track *b* is also applied to the various conductive segments on the other tracks.

Each of the identical control circuits 26 to 29 is constituted by an amplifier including an electron discharge tube 32 whose anode is connected through the coupling gear electromagnet 20 to the positive terminal (++) of a voltage source, the cathode being connected to the ground. The grid is connected through a resistor 41 having a relatively high ohmic valve to a source of negative bias (−) relative to ground. The grid of tube 32 is also connected through rectifiers 33, 34, 35 and 36 having a relatively low resistance in the conductive direction, in series with switches 37, 38, 39 and 40 to brushes *d'*, *e'*, *f'* and *g'*, respectively. Hence when any one of switches 37 to 40 is closed and the associated brush makes contact with a conductive segment, a positive bias is impressde on the grid of the associated tube 32 which overcomes the fixed negative bias thereon to cause a flow of anode current sufficient to energize electromagnet 20.

The step-clutch control circuit includes an electron discharge tube 42 whose anode is connected to the positive terminal (++) of the voltage source through the electromagnet 21, while the reverse-clutch circuit includes a tube 43 similarly connected with respect to electromagnet 22. The grids of tubes 42 and 43 are connected through resistors 44 and 45 to the source of negative bias (−) and through brushes *c'* and *a'*, respectively, to the source of positive bias (+). Thus when brush *c'* engages a conductive segment on track *c*, electromagnet 21 is energized, and when brush *a'* engages a conductive segment on track *a*, electromagnet 22 is rendered operative.

The input binary information is applied to the switches 37 to 40, a (0) digit being represented by an open switch condition and a (1) digit by a closed switch condition. Thus, if all the switches are closed to represent the binary number 1111, the sequential energization of electromagnet 20 will be in accordance with this number.

The commutator assembly 25 rotates in the counterclockwise direction. The relative radial position of the segments in tracks *d*, *e*, *f* and *g* are such that in the course of a revolution, the conductive segments on tracks *d*, *e*, *f* and *g* engage brushes *d'*, *e'*, *f'* and *g'* in unbroken succession. In the event therefore all of the switches 37 to 51 are closed to represent binary number 1111, the energization of electromagnet 20 is uninterrupted to provide serial reading of 1111. However, should the binary number be 0110, the relay 20 will undergo the following sequential operation: non-energization (0); energization (1), energization (1), non-energization 0.

As will be seen from the relative arcuate lengths of the segments on tracks *d*, *e*, *f* and *g*, the periods of energization are correlated with the significances or weights of the binary digits. As many step-clutch control circuits are provided as there are printing mechanisms in the output section to provide the desired number of columns in the printed result.

The track *c* for the step-clutch contains two arcuate segments of conductive material separated by two segments of non-conductive material, whereby in the course of a revolution two alternations are produced, each constituted by a positive-going step voltage and a negative-going step voltage. The step-clutch is actuated in response to each step voltage to effect a stepping action, as hereinafter described, whereby at the introduction of the first binary digit, the printing wheel is shifted one step; at the second digit, two steps; at the third digit, four steps; and at the fourth digit, eight steps.

Of course, in he event the coupling gear 19 is retracted at the introduction of a given digit, the printing wheel is not shifted so that the ultimate position of the wheel depends on the applied binary number. The step-clutch actuating segments in track *c* are displaced somewhat with respect to the related coupling-gear actuating segments in tracks *d*, *e*, *f* and *g*, so that a time lag exists therebetween. The reason for this is to make allowance for the time required for the coupling gear, in response to the operation of the control circuit therefor, to effect engagement with the main gear and the idler gear.

After the printing wheel position has been selected and the printing operation carried out, the reverse clutch electromagnet 22 is energized when the conductive segment on track *a* engages brush *a'*, thereby returning the wheel to its starting position.

Figure 3:
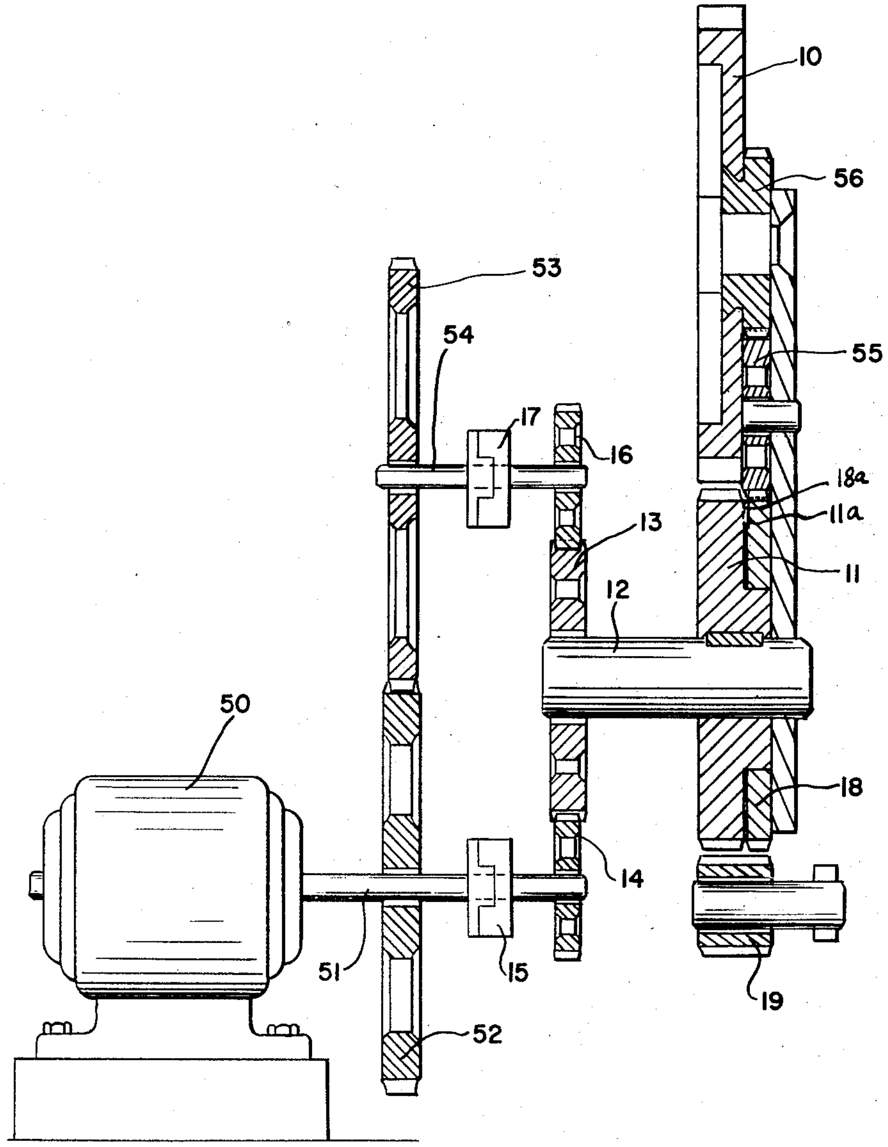
Fig. 3 is a sectional view taken along lines 3—3 in Fig. 2.

The arrangement of gears and shafts for orienting the printing wheel 10 may be best seen in Fig. 3, the wheel being driven by a motor 50 whose armature shaft 51 terminates in the step-clutch 15, which in turn is coupled to pinion 14 for driving spur gear 13 in the forward direction. In order to drive the spur gear 13 in the reverse direction when resetting the wheel, a gear 52 is attached to armature shaft 51 and intermeshes with a like gear 53 mounted on a shaft 54 coupled to reverse-clutch 17, which in turn is coupled to the pinion 16. Thus when reverse-clutch 17 is operated, spur gear 13 is driven in the reverse direction.

Spur gear 13 is mounted at one end of the indexing shaft 12, the main gear 11 being keyed to the other end thereof. Main gear 11 is provided with an axial projection on which is freely mounted idler gear 18 which has the same number of teeth as main gear 11. Idler gear 18 intermeshes with a small gear 55 which in turn engages the teeth of a drive gear 56 coaxial with the printing wheel 10 and secured thereto.

Figure 2:
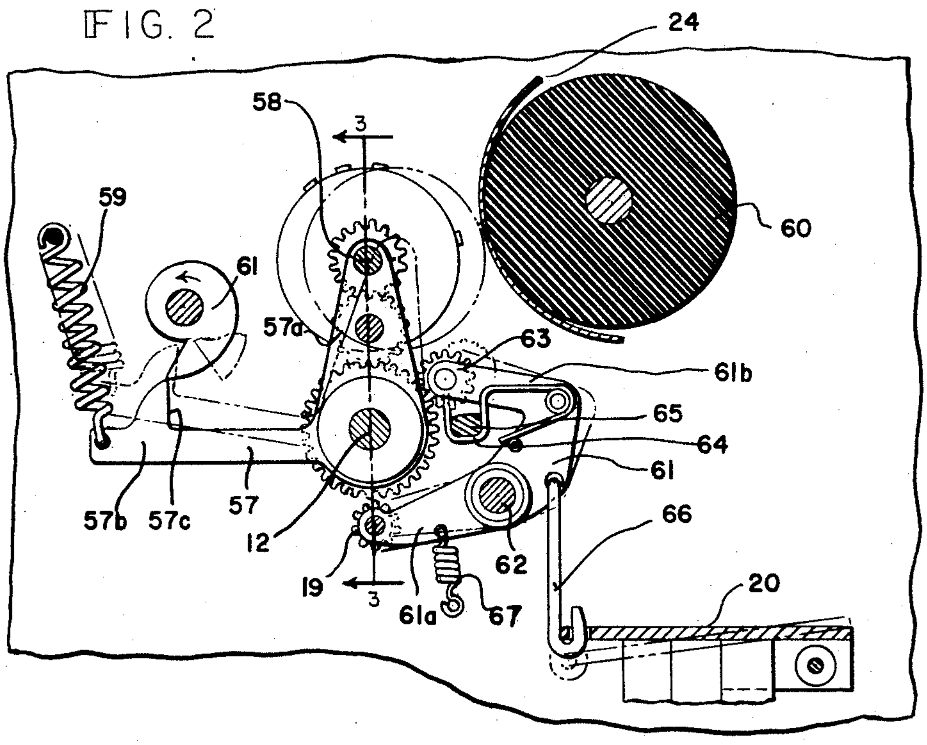
Fig. 2 is a side view of the decoding-printing mechanism in accordance with the invention.

As best seen in Fig. 2, pivotally mounted on indexing shaft 12 is a bell-crank lever 57 having a triangularly shaped arm **57*a* at whose apex is supported a stud 58 on which is mounted the printing wheel 10 and the drive gear 56. The second arm 57*b* of the lever extends at right angles to arm 57*a*, the extremity of arm 57*b* being linked to a helical spring 59 which urges the bell crank in a direction to swing the printing wheel into printing engagement with tape 24. Tape 24 is borne on a suitable rotary drum 60**.

Arm **57*b* is provided with an upwardly projecting tooth 57*c* which co-acts with a rotary cam 61 having a shape such that the printing wheel in the course of its orientation to a printing position is retracted from the tape 24**. When the wheel is properly oriented, the cam releases the lever sufficiently to permit the swing thereof into printing engagement.

Coupling gear 19 is mounted at the end of one arm **61*a* of a rocker 61 pivoted by a stud 62, which arm is biased downwardly by a spring 63 to retract gear 19. Rocker 61 is provided with a U-shaped arm 61*b* at the end of which is supported a stop gear 63, which when coupling gear 19 is retracted, engages idler gear 18 to prevent rotation thereof. Rotation of stop gear 63 is arrested by means of a flat spring 64 mounted on arm 61*b* and having one end insertable between adjacent teeth of step gear 63. A cam-actuated bar 65 is provided adapted to withdraw spring 64**.

To shift coupling gear 19 into engagement with main gear 11 and idler gear 18, the rocker 61 is coupled by a link 66 to the armature of the electromagnet 20, such that upon energization of the magnet, the rocker swings against the tension of spring 63 to shift gear 19 into its operative position and simultaneously to withdraw stop gear 63 to permit rotation of the printing wheel.

After the printing wheel has been set to printing position, electromagnet 20 is de-energized, thereby causing withdrawal of the coupling gear 19 and the insertion of stop gear 63 into intermeshing relation with idler gear 18. Subsequent to the swing of the printing wheel to print on the tape, the stop gear 63 is freed by a pressure brought to bear on bar 65 by a cam means synchronized with the rotation of the commutator 25 such that when reverse clutch 17 is actuated, the main gear is rotated in the reverse direction to shift the printing wheel to its initial position.

As may be seen in Fig. 3, the main gear 11 is provided with a protuberance **11*a* and the idler gear 18 is provided with a complementary protuberance 18*a*. Should the coupling gear 19**, being in operative position during the entire setting cycle in response to binary number 1111, then the two protuberances will maintain their relative positions. However, for any other binary number, an angular displacement will be effected between the two protuberances to an extent depending on the binary number. When the reverse clutch is operated, the co-action of the protuberance in the course of reverse rotation will restore the initial condition.

While there has been shown what at present is considered to be a preferred embodiment of the invention, it will be obvious that many changes and modifications may be made therein without departing from the essential aspect thereof. It is intended therefore in the appended claims to cover all such changes and modifications as fall within the true spirit of the invention.

What is claimed is:

1. Apparatus for decoding and printing binary information comprising a printing wheel carrying characters at angular spaced positions thereon, an indexing shaft having a main gear keyed thereto and an idler gear freely rotatable thereon, gear means intercoupling said printing wheel with said idler gear, step-clutch means to impart a series of angular displacements to said shaft corresponding to the successive weights of a binary coded-decimal binary system, a stop gear engageable with both said idler gear and main gear to prevent rotation thereof, a coupling gear simultaneously engageable with said idler gear and said main gear to effect an operative coupling between said main gear and said printing wheel, and electromagnetic means responsive to said binary information selectively to shift said coupling gear into operative engagement and simultaneously to withdraw said stop gear in accordance with the significances of the successive digits in said binary information, whereby said printing wheel is angularly displaced in a series of steps to a position representative of said information.

2. Apparatus as set forth in claim 1 further including cam means to cause said wheel to print subsequent to the angular setting thereof.

3. In a decoding-printing mechanism, a commutator circuit arrangement for reading off simultaneously present binary code information in serial form, said arrangement including a commutator assembly having a plurality of concentric tracks rotatable with respect to respective fixed contact brushes, each track including a conductive segment, an amplifier including an electron discharge tube having a cathode, a grid and an anode and circuits therefor, an electromagnet in the anode-cathode circuit for activating the printing mechanism, bias means coupled to said grid to maintain said electromagnet normally de-energized, a like plurality of switches each connected between said grid and a respective brush on said assembly, said switches being opened or closed in accordance with an applied binary digit, and means to apply a positive bias to said segments whereby when engaged by a brush said positive bias is applied to said grid to render said electromagnet operative.

4. In a decoding-printing mechanism including a printing wheel, and means to displace said wheel angularly, a commutator circuit arrangement for reading off simultaneously present binary code information in serial form, said arrangement including a commutator assembly having a plurality of concentric tracks rotatable with respect to respective contact brushes, each track including a conductive segment, an amplifier including an electron discharge tube having a cathode, a grid and an anode and circuits therefor, an electromagnet in the anode-cathode circuit and operatively coupled to said wheel displacement means bias means coupled to said grid to maintain said electromagnet normally de-energized, a like plurality of switches each connected between said grid and a respective brush on said assembly, said switches being opened or closed in accordance with an applied binary digit, and means to apply a positive bias to said segment whereby when engaged by a brush said positive bias is applied to said grid to render said magnet operative.

References Cited in the file of this patent

UNITED STATES PATENTS

| | | |
|---|---|---|
| 2,010,158 | Kleinschmidt | Aug. 6, 1935 |
| 2,164,956 | Smith | July 4, 1939 |
| 2,271,673 | Zenner | Feb. 3, 1942 |
| 2,333,318 | Krum | Nov. 2, 1943 |
| 2,339,313 | Zenner | Jan. 18, 1944 |
| 2,557,964 | Herbst | June 26, 1951 |
| 2,668,870 | Ridler | Feb. 9, 1954 |
| 2,680,970 | Durkee | June 15, 1954 |
| 2,720,832 | Luning | Oct. 18, 1955 |
| 2,771,599 | Nolde, et al. | Nov. 20, 1956 |